(12) United States Patent
Chen

(10) Patent No.: US 10,625,815 B2
(45) Date of Patent: Apr. 21, 2020

(54) METHOD FOR MANUFACTURING BICYCLE CRANK

(71) Applicant: ALEX GLOBAL TECHNOLOGY INC., Tainan (TW)

(72) Inventor: Wei-Chin Chen, Tainan (TW)

(73) Assignee: Alex Global Technology, Inc., Tainan (TW)

(*) Notice: Subject to any disclaimer, the term of this patent is extended or adjusted under 35 U.S.C. 154(b) by 131 days.

(21) Appl. No.: 15/835,875

(22) Filed: Dec. 8, 2017

(65) Prior Publication Data
US 2019/0176929 A1    Jun. 13, 2019

(51) Int. Cl.
| | |
|---|---|
| *B62M 3/00* | (2006.01) |
| *B21D 7/00* | (2006.01) |
| *B21K 17/00* | (2006.01) |
| *B21J 5/00* | (2006.01) |
| *B21D 53/86* | (2006.01) |
| *B23P 15/00* | (2006.01) |

(52) U.S. Cl.
CPC .............. *B62M 3/00* (2013.01); *B21D 7/00* (2013.01); *B21D 53/86* (2013.01); *B21J 5/002* (2013.01); *B21K 17/00* (2013.01); *B23P 15/00* (2013.01)

(58) Field of Classification Search
CPC ........... Y10T 29/49391; Y10T 29/5185; Y10T 29/5199; Y10T 29/53987; Y10T 29/5116; B62M 3/00
See application file for complete search history.

(56) References Cited

U.S. PATENT DOCUMENTS

| | | | | |
|---|---|---|---|---|
| 2,182,958 | A * | 12/1939 | Bullock | B62M 3/00 |
| | | | | 29/888.08 |
| 5,625,948 | A * | 5/1997 | Kuroda | B21C 37/28 |
| | | | | 29/890.149 |
| 6,266,990 | B1 * | 7/2001 | Shook | B21K 1/063 |
| | | | | 29/557 |
| 2005/0217417 | A1 * | 10/2005 | Uchida | B21D 53/86 |
| | | | | 74/594.1 |
| 2010/0230926 | A1 * | 9/2010 | Dodman | B62K 21/02 |
| | | | | 280/276 |

* cited by examiner

*Primary Examiner* — Jason L Vaughan
*Assistant Examiner* — Amanda Kreiling
(74) *Attorney, Agent, or Firm* — Rosenberg, Klein & Lee

(57) ABSTRACT

A method for manufacturing a bicycle crank is revealed. After being extended, bent and forged, an aluminum alloy pipe becomes an L-shaped part formed by a cylindrical crankshaft portion and an oval crank portion integrally connected to each other. A plug is inserted into an outer end of the crank portion while a periphery of an outer end of the crankshaft portion is punched to form a shaft-connecting portion. An assembling hole is arranged at the outer end of the crank portion, corresponding to the plug. Thus a bicycle crank is produced. Thereby not only the assembly of the bicycle crank is easier and more convenient, the structural strength of the bicycle crank is increased effectively to against vibrations and impacts. The bicycle is lightweight and the bicycle crank is more streamlined so that consumers are attracted. Thereby the market competitiveness is increased.

3 Claims, 4 Drawing Sheets

METHOD FOR MANUFACTURING BICYCLE CRANK

BACKGROUND OF THE INVENTION

Field of the Invention

The present invention relates to a method for manufacturing a bicycle crank, especially to a method for manufacturing a bicycle crank by which not only the assembly of the bicycle crank is easier and more convenient, the structural strength of the bicycle crank is improved significantly. Thus the bicycle crank is more durable to large and frequent vibrations. The weight of the bicycle crank is reduced so that the bicycle is lightweight. The bicycle crank is more streamlined and beautiful so as to attract consumers and increase the market competitiveness.

Description of Related Art

Instead of walk, bicycles are a great transportation option. The vehicle is moved along with user's feet steering the wheels. Riding bicycles is not only for fitness but also as a recreation. No fuel is required to run the bicycle so that the bicycle is energy efficient and environment friendly. For students that are too young to ride motorcycles or drive cars, bicycles are one of the essential means of transport with higher safety owing to slower speed. Thus there is a growing demand for bicycles in recent years and bicycles have become one of the most popular transportation devices and fitness equipment. Various types of bicycles have been invented along with population of bicycles. For example, a road bike is designed specifically for riding on roads while a mountain bike is suitable for rough and bumpy terrain. Folding bikes are simple to fold and easy to store while small-wheel bicycles are compact and light for easy carrying and storage.

Refer to FIG. 4, one end of a crank 2 is disposed with a crankshaft hole 21 while the other end thereof is arranged with a pedal hole 22. One end of a crankshaft 23 is inserted into the crankshaft hole 21 and a connecting member 24 is used to connect and fix the crankshaft 23 with the crankshaft hole 21. The pedal hole 22 on the other end of the crank 2 is used to connect to a pedal.

The crank can be installed on the bicycle for allowing users applying forces on the pedals to drive the bicycle to move. However, the connection between the crank and the crankshaft by the connection member still has certain shortcomings while in use. The assembly of the crank, the crankshaft and the pedal is not convenient. The structural strength of the connection between the crank and the crankshaft is weaker so that cracking and damage occurs easily. The increased weight of the assembly has negative effects on the whole weight of the bicycle.

Thus there is room for improvement and there is a need to provide a new method for manufacturing a bicycle crank without the above shortcomings.

SUMMARY OF THE INVENTION

Therefore it is a primary object of the present invention to provide a method for manufacturing a bicycle crank by which an integrated bicycle crank is produced. Not only the assembly of the bicycle crank is easier and more convenient, the structural strength of the bicycle crank is increased effectively because that the bicycle crank is integrally formed, without being connected by threads. Thereby the bicycle crank is more durable to large and frequent impacts. The weight of the bicycle crank is reduced so that the bicycle is lightweight. The bicycle crank is more streamlined and beautiful so as to attract consumers and increase the market competitiveness.

In order to achieve the above object, a method for manufacturing a bicycle crank according to the present invention includes the following steps: (A) preparing a tube, (B) extending the tube, (C) bending the tube, (D) first forging and shaping, (E) cutting scraps, (F) assembling a plug, (G) second forging and shaping, (H) forming a shaft-connecting portion and an assembling hole, and (I) performing grinding and polishing. Firstly prepare aluminum alloy pipe with a certain length. Then extend one end of the tube to the length required so that one end of the tube becomes a narrower crankshaft portion while the other end thereof forms a crank portion. Bend the crankshaft portion of the tube so that the crankshaft portion and the crank portion are integrally connected to form an L-shaped part. Next the L-shaped tube is placed into a mold cavity of a first mold so that the tube is forged into the shape of the mold cavity of the first mold. This step is mainly for rough shaping of the crankshaft portion and the crank portion while residual burrs and scraps are also formed. Then the burrs and the scraps generated during the first forging and shaping are cut and removed. An outer end of the crank portion of the tube is heated and expanded and then a plug is inserted into the outer end of the crank portion for being connected to and fixed on the crank portion firmly after the outer end of the crank portion being cooled. The tube is placed into a mold cavity of a second mold so that the tube is forged into the same shape as the mold cavity of the second mold. At this time, the crank portion is forged into an oval shape while the plug is connected to the crank portion stably, without falling off. The L-shaped part formed by the crank portion connected with the crankshaft portion is extruded and extended in the mold cavity. A periphery of an outer end of the crankshaft portion is punched to form a shaft-connecting portion and an assembling hole is arranged at the outer end of the crank portion at the position corresponding to the plug. Thus a bicycle crank is produced.

The present method further includes a step of performing grinding and polishing after the step of forming a shaft-connecting portion and an assembling hole. The surface of the bicycle crank is ground and polished by this step.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

In order to learn technical content, functions and features of the present invention more clearly, please refer to the following detailed descriptions, related figures and reference numbers therein.

Figure 1:
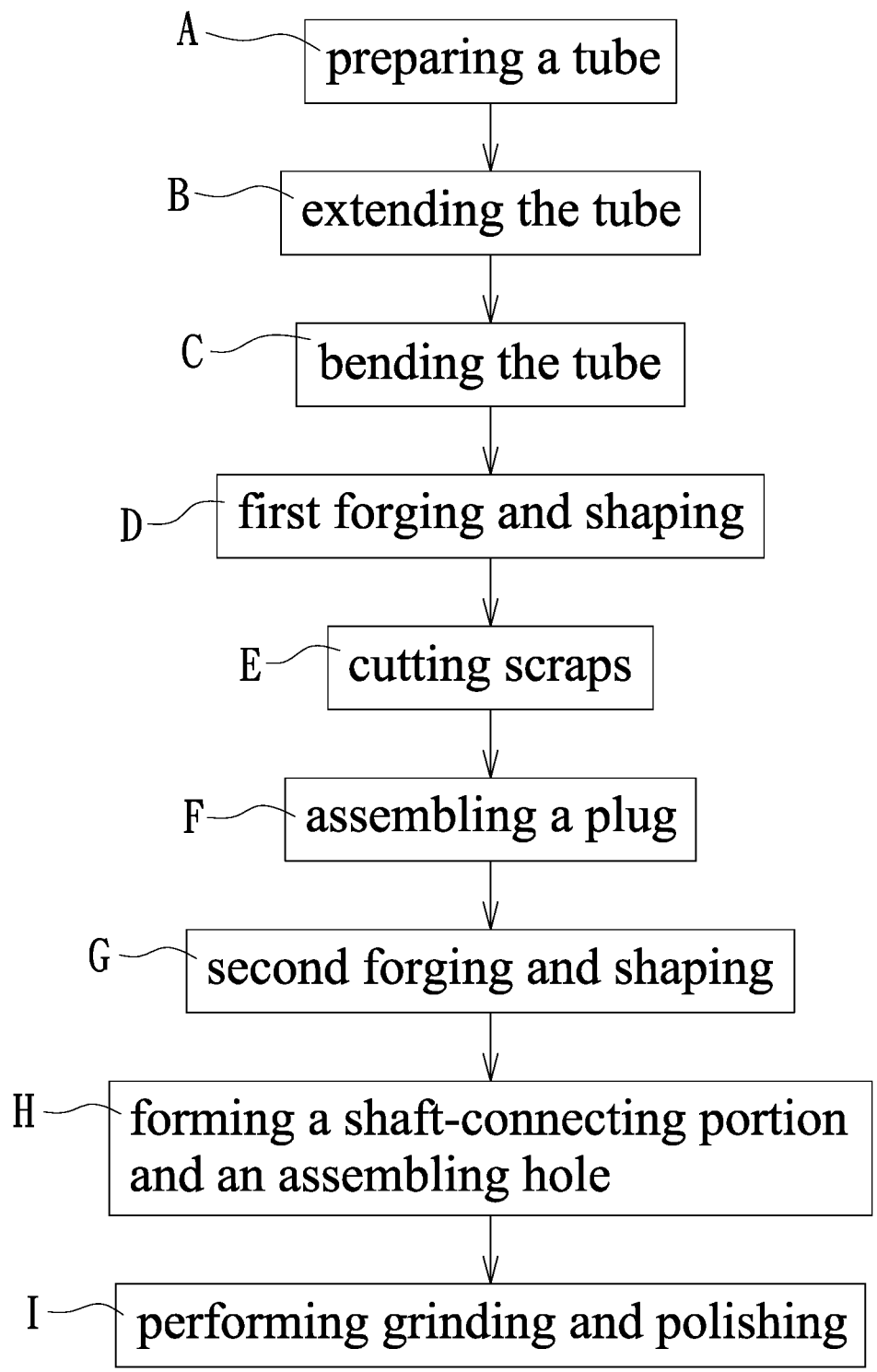
FIG. 1 is a flow chart showing steps of an embodiment according to the present invention.
Figure 2:
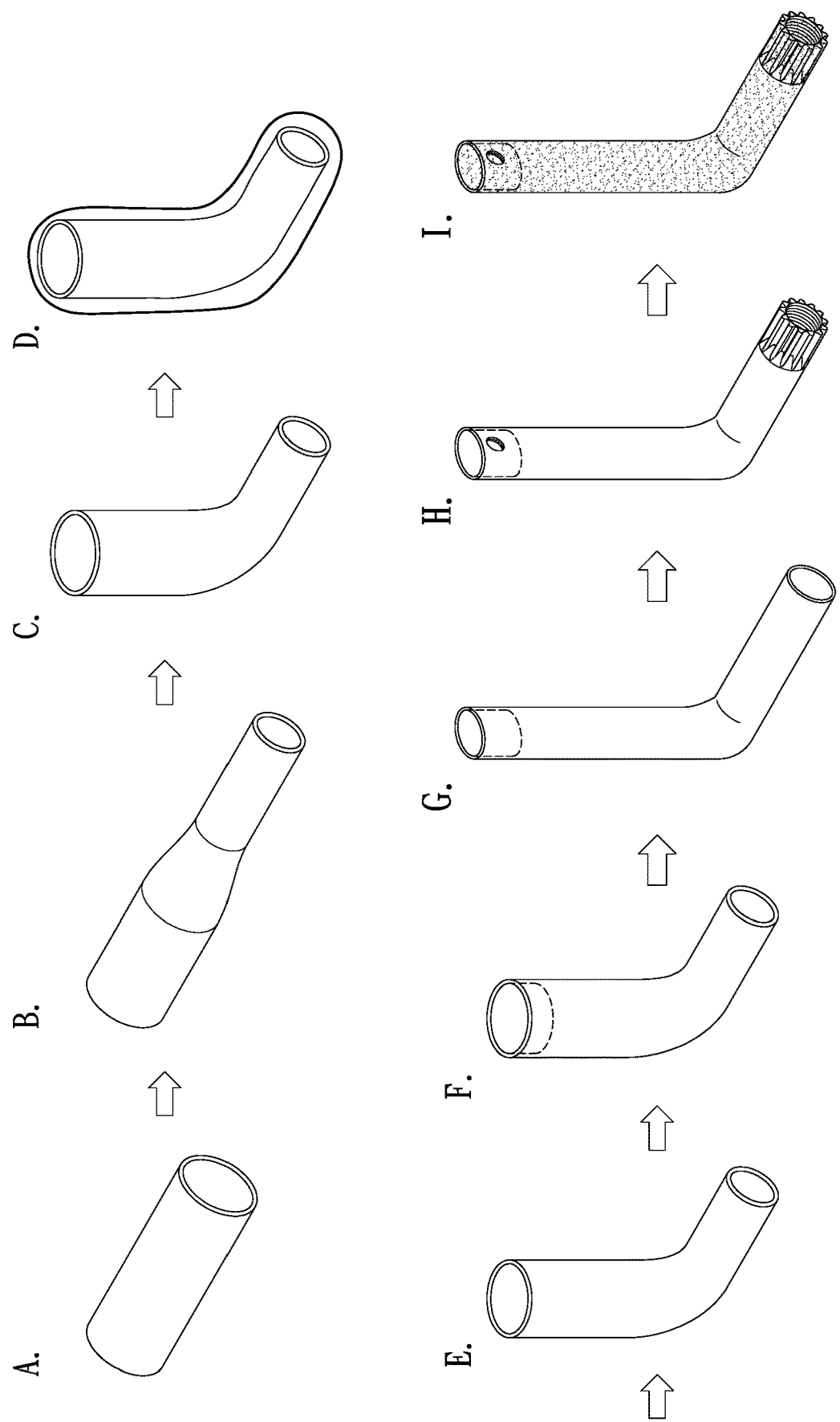
FIG. 2 is a schematic drawing showing implementation of an embodiment according to the present invention.

Refer to FIG. 1 and FIG. 2, a method for manufacturing a bicycle crank according to the present invention includes the following steps.

(A) preparing a tube: preparing aluminum alloy pipe with a certain length;

(B) extending the tube: extending one end of the tube to the length required so that one end of the tube becomes a narrower crankshaft portion while the other end thereof forms a crank portion.

(C) bending the tube; bending the crankshaft portion of the tube so that the crankshaft portion and the crank portion are integrally connected to form an L-shaped part;

(D) first forging and shaping: placing the L-shaped tube into a mold cavity of a first mold so that the tube is forged into the shape of the mold cavity of the first mold. At this step, the crankshaft portion and the crank portion are shaped roughly while residual burrs and scraps are also formed.

(E) cutting scraps: cutting and removing the burrs and the scraps generated during the first forging and shaping.

(F) assembling a plug: heating an outer end of the crank portion of the tube so that the outer end of the crank portion is expanded and then inserting an aluminum alloy plug into the outer end of the crank portion; thus the plug is connected to and fixed on the crank portion firmly after the outer end of the crank portion being cooled;

(G) second forging and shaping: placing the tube into a mold cavity of a second mold so that the tube is forged into the shape of the mold cavity of the second mold. At this time, the crank portion is forged into an oval shape while the plug is connected to the crank portion stably, without falling off. The L-shaped part formed by the crank portion connected with the crankshaft portion is extruded and extended in the mold cavity.

(H) forming a shaft-connecting portion and an assembling hole: punching a periphery of an outer end of the crankshaft portion to form a shaft-connecting portion and opening an assembling hole on the outer end of the crank portion at the position corresponding to the plug; thus a bicycle crank is produced;

(I) performing grinding and polishing: performing surface treatment such as grinding, polishing, etc. on the bicycle crank to get a bicycle crank product with a smooth and clear surface.

Figure 3:
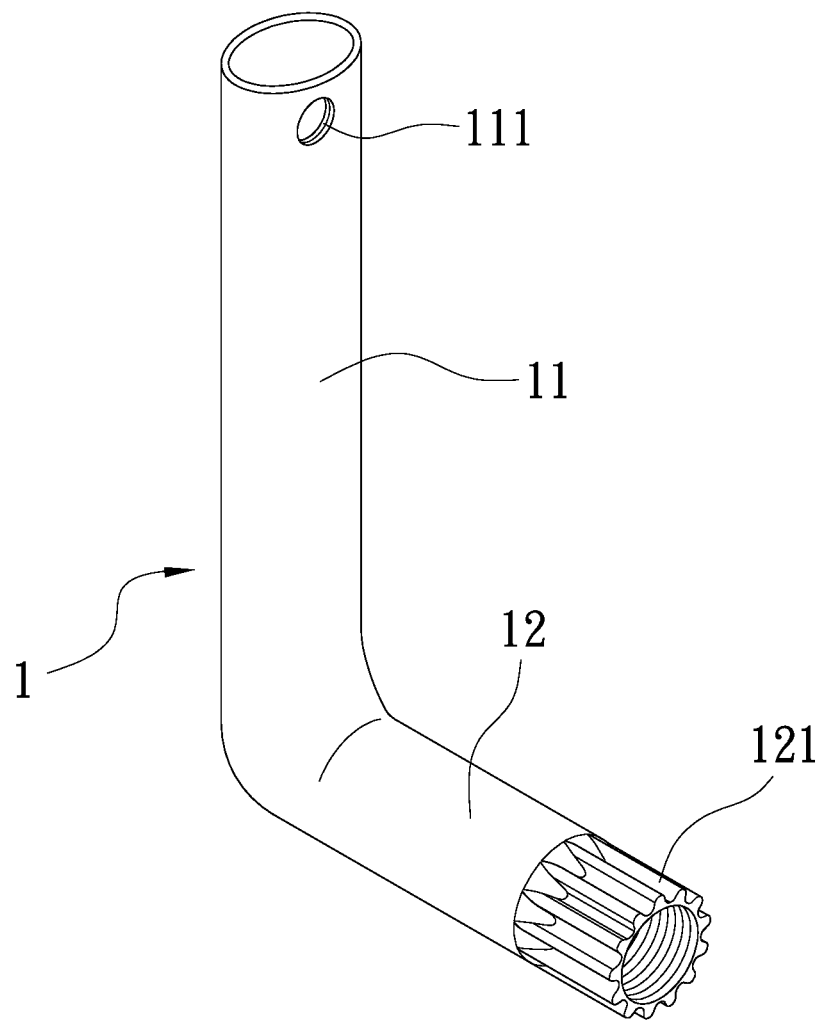
FIG. 3 is a perspective view of a product manufactured by an embodiment according to the present invention.
Figure 4:
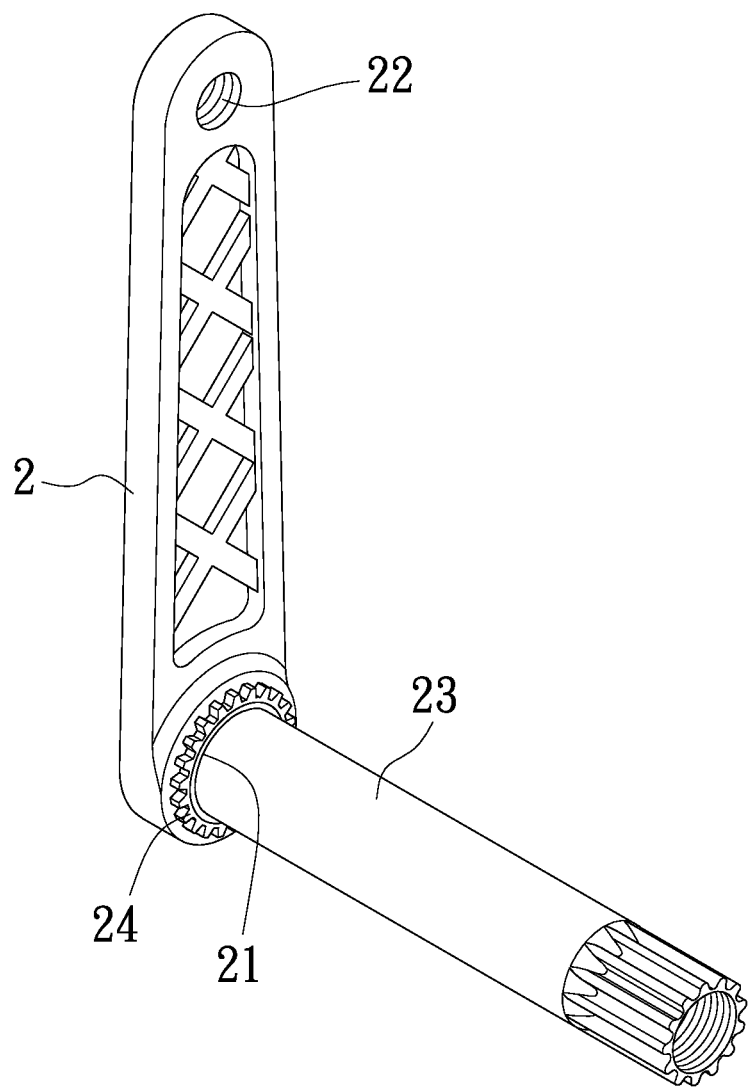
FIG. 4 is a perspective view of a prior art.

Refer to FIG. 3, a bicycle crank 1 produced by the present method is an integrated L-shaped part formed by a crank portion 11 connected to a crankshaft portion 12. An assembling hole 111 is disposed on an outer end of the crank portion 11 for being connected to a bicycle pedal. A shaft-connecting portion 121 is formed on an outer end of the crankshaft portion 12 by punching a periphery of the outer end of the crankshaft portion 12 and is used to connect to bicycle chainrings.

Compared with the technique available now, the bicycle crank produced by the present invention has the following advantages. The bicycle crank produced is one part. Not only the assembly of the bicycle crank is easier and more convenient, the structural strength of the bicycle crank is increased effectively because that the crank portion 11 and the crankshaft portion 12 are integrated instead of being threaded with each other. Thus the bicycle crank is more durable to large and frequent vibrations. The weight of the bicycle crank is minimized so that the bicycle is lightweight. Moreover, the bicycle crank is more streamlined and attractive to consumers so that the market competitiveness is improved. Therefore the bicycle crank is more practical in use.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalent.

What is claimed is:

1. A method for manufacturing a bicycle crank, comprising:

(A) preparing a tube: preparing a tube of aluminum alloy with a certain length;

(B) extending the tube: extending a first end of the tube to a required length, the first end of the tube thereby being narrowed and forming a crankshaft portion, a second end of the tube thereby forming a crank portion;

(C) bending the tube: bending the crankshaft portion of the tube to thereby form an L-shaped part integrally connecting the crankshaft portion and the crank portion;

(D) first forging and shaping: placing the L-shaped part into a mold cavity of a first mold, and forging the tube therein into a shape of the mold cavity of the first mold;

(E) cutting scraps: cutting and removing residual burrs and scraps generated during the first forging and shaping;

(F) assembling a plug: heating and thereby expanding an outer end of the crank portion of the tube, and then inserting a plug into the outer end of the crank portion to thereby connect the plug to the crank portion in firmly fixed manner after the outer end of the crank portion is cooled;

(G) second forging and shaping: placing the tube into a mold cavity of a second mold, and forging the tube therein into a shape of the mold cavity of the second mold, the crank portion thereby formed into an oval shape, the plug being retentively connected to the crank portion, the L-shaped part being extruded and extended in the mold cavity of the second mold; and (H) forming a shaft-connecting portion and an assembling hole: punching a periphery of an outer end of the crankshaft portion to form a shaft-connecting portion and opening an assembling hole through the outer end of the crank portion at a position corresponding to the plug.

2. The method as claimed in claim 1, wherein the method further includes performing grinding and polishing after the step of forming a shaft-connecting portion and an assembling hole for surface treatment of the bicycle crank.

3. The method as claimed in claim 1, wherein the assembling hole is opened through the outer end of the crank portion and through the plug after insertion of the plug.

* * * * *